(12) United States Patent
Curley et al.

(10) Patent No.: US 6,225,943 B1
(45) Date of Patent: May 1, 2001

(54) METHOD OF OPERATING PULSE RADAR

(75) Inventors: John J. Curley, Chelmsford; Edward J. Sheldon, Lexington; Nathan Slawsby, Canton, all of MA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 05/901,538

(22) Filed: May 1, 1978

(51) Int. Cl.$^7$ .................................................. G01S 13/22
(52) U.S. Cl. .......................... 342/137; 342/145; 342/195
(58) Field of Search ....................... 343/17.2 R, 17.1 PF, 343/17.2 PC; 342/62, 73, 82, 84–87, 128, 129, 131, 132, 134, 135, 137, 145, 195, 200–204

(56) References Cited

U.S. PATENT DOCUMENTS

| | | | |
|---|---|---|---|
| 3,355,734 | * 11/1967 | Albanese | 343/17.2 R X |
| 3,480,956 | * 11/1969 | Sanderson | 343/17.2 R X |
| 3,747,099 | * 7/1973 | Wong | 343/17.2 PC |
| 3,774,206 | * 11/1973 | Rauch | 343/17.2 R X |
| 4,019,185 | * 4/1977 | Morgan | 343/17.2 R |
| 4,028,699 | * 6/1977 | Stevens | 343/17.2 PC X |

* cited by examiner

Primary Examiner—John B. Sotomayor
(74) Attorney, Agent, or Firm—Daly, Crowley & Mofford, LLP

(57) ABSTRACT

A method, and exemplary apparatus for practicing the method, is shown for operating a pulse radar to allow the radar ambiguity function of such radar to be modified by controlling the range and Doppler ambiguities due to the pulse waveform of such radar.

6 Claims, 11 Drawing Sheets

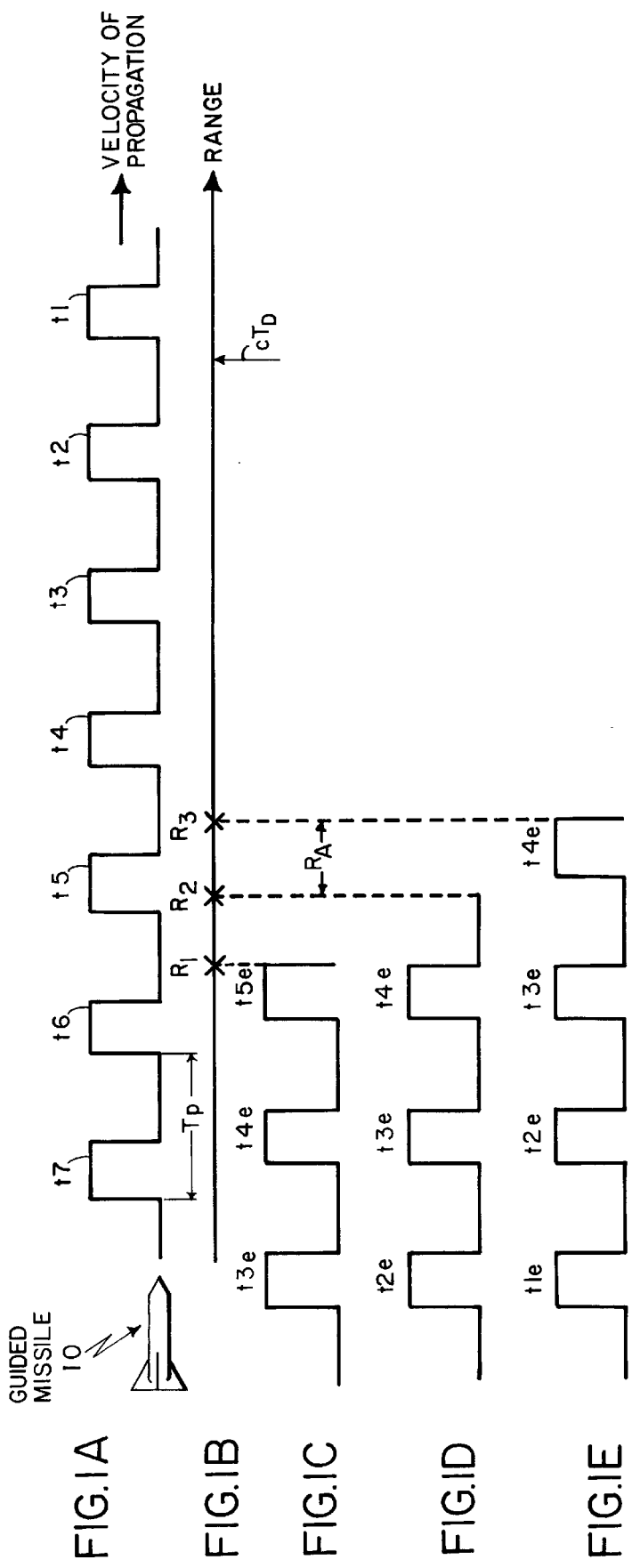

METHOD OF OPERATING PULSE RADAR

BACKGROUND OF THE INVENTION

This invention pertains generally to active radar seekers for guided missiles and particularly to a method for encoding a high pulse repetition frequency (PRF) pulse train waveform to produce range and Doppler resolution characteristics approximating those of a low PRF waveform.

Recent and ongoing advances in the design of solid state transmitters such as those described in the pending U.S. patent application entitled "Solid State Power Combiner", Ser. No. 814,746, filed Jun. 30, 1977, Inventors Jerinic et al, (which application is assigned to the same assignee as this application) have resulted in a class of compact, lightweight, solid state transmitters particularly well suited for use in active radar seekers for guided missiles. In such an application operation is usually carried out with a high duty factor (ideally around 30 percent) in order to provide high average power for optimum target detectability and increased target detection range. A 30 percent duty factor presents no problems with high PRF waveforms. However, with low PRF waveforms a 30 percent duty, factor would result in relatively long pulse widths which are not easily realized with known solid state transmitters because of the thermal and RF impedance matching problems encountered with the oscillators (IMPATT diodes or the like) in such transmitters.

It will be appreciated by those of skill in the art that pulse train waveforms are described as being of high, medium or low PRF to indicate the relationships which exist between waveform ambiguity spacings and the extent of the clutter-target complex in range and frequency. Thus, for example, the PRF is considered to be high when the spread of any clutter and all targets of interest is less than such frequency and the PRF is considered to be low when the range ambiguity is greater than the maximum target range. That is to say, a high PRF waveform is one which eliminates Doppler ambiguities and a low PRF waveform is one which eliminates range ambiguities. It follows then that a medium PRF is one which allows range and Doppler ambiguities within the zone occupied by clutter and targets. Each PRF possesses peculiar advantages and disadvantages.

As is known, the full advantage of the high PRF waveform is realized in the case of approaching targets. In such case, targets exhibit positive Doppler shifts which may be great enough to move the target echo signals to frequencies which are substantially higher than those of any clutter signals. There are many known ways, then, to effect high pass filtering to separate target echo signals from clutter signals and to process only the target echo signals to derive the requisite guidance commands. Crossing targets, on the other hand, exhibit little, if any, Doppler shifts so the target echo signals remain in the same frequency region as any clutter signals. Further, in the case of the crossing targets illuminated by a high PRF waveform range ambiguities exist which lie along lines which are almost parallel to the strongest main lobe clutter contour. Because the target echo signals from the crossing targets must compete with the sum of the clutter signals the high PRF waveform is the worst possible choice for distinguishing crossing targets in a high clutter environment, as, for example, in a so-called "look down" engagement.

The effect of a high PRF waveform in the case of a receding target is somewhat more complex. Thus, when competing clutter signals are of little import (as when a guided missile and a target are at high altitudes so that the amplitudes of ground clutter signals are low and there is no clutter from precipitation) operation is satisfactory. In situations when competing clutter signals have relatively high amplitudes it becomes very difficult to distinguish between target echo signals from receding targets and clutter signals. Thus, when the altitude of either the guided missile or a desired receding target is low, i.e. in either a so-called "look up" or "look down" situation, the power of ground clutter signals (received in the "look up" situation through sidelobes and in the "look down" situation through the main lobe) usually is high enough to mask the target echo signals. Even when ground clutter signals are not large enough to prevent target echo signals from being distinguished, clutter signals from precipitation, as rain, may be encountered. In such a situation (which is analogous to the "look down" situation in teat main lobe clutter is experienced) the amplitude of the clutter signals may also be so high that target echo signals cannot be distinguished.

It will now be apparent that, while a high PRF waveform is the optimum waveform for use against an approaching target, a waveform which is better fitted to other tactical situations would be desirable. The most obvious change in the PRF waveform would be to employ a multiple, or staggered, PRF waveform so selected that the blind region of either mainlobe or sidelobe clutter signals is within a clear region. However, as noted hereinabove, multiple PRF waveforms are not easily realized with a solid state transmitter using IMPATT diodes operating at a 30 percent duty factor. Therefore, other waveforms, incorporating binary and polyphase coding of the carrier phase as well as pulse-to-pulse frequency coding, are better fitted to resolve the range-Doppler ambiguity problem when IMPATT diodes are involved.

In one known coding approach a pseudo-random coded pulse waveform which consists of some number, N, of sequential rectangular pulses, or, equivalently, a single pulse divided with N contiguous subpulses, may be used. The R.F. phase of each pulse, or subpulse, in the waveform is set to either 0 or 180 degrees in accordance with a randomly or systematically derived sequence. The particular sequence chosen is often one which creates uniformly low sidelobes in the ambiguity function along the range axis (i.e., the autocorrelation function of the waveform). However, such sidelobes cannot be maintained over the entire range-Doppler space so the use of the pseudo-random coded pulse waveform is limited in practice to situations where the Doppler shifts of target echo signals are confined to a narrow band of frequencies.

In another coding approach, a maximal-length sequence binary code is used to impose a phase shift of either 0° or 180° on a pulse train waveform in accordance with a stored algorithm. A code of this type yields an ambiguity function characterized by major peaks of amplitude "N" (where "N" is the number of pulses in one code cycle) spaced in time by "NT" (where T is the interpulse period of the transmitted code) along the range axis. Between the major peaks, however, are minor peaks of unit amplitude and spacing "T". These minor peaks have significant impact on performance when applied to an active seeker waveform for use in a high clutter environment. Further, and of even greater importance, ridges having an rms amplitude of $\sqrt{N}$ appear at harmonics of the code repetition frequency.

In another coding approach a so-called "Frank code", described in "Radar Signals" by C. E. Cook and M. Bernfield, Academic Press, New York, 1967, Chapter 8, pg. 225, is used. With such a code no minor peaks appear between the major peaks on the range axis, but, at harmonics of the code repetition frequency, noise-like peaks of amplitude √N and spacing "T" do occur. As a result, therefore, nearly the same performance limitations are applicable as when a maximal-length binary code is used.

Other pulse coding approaches employ pulse-to-pulse changes in frequency rather than phase. Two variations of such coding approaches which produce nearly the same result have been implemented. In one known implementation a number of frequency sources, each locked to the harmonics of a common difference frequency, are sequentially selected to produce a waveform which may be considered to be a periodic staircase of frequency versus time. In the second known implementation a repetitive frequency ramp is sampled periodically by a train of pulses. The ambiguity function for either coded waveform exhibits minor peaks, between the major peaks, along the lines of constant Doppler with delay spacing T, and an amplitude which is a function of pulse width. Such minor peaks impose a performance limit on the waveform which becomes increasingly more difficult to meet with increasing duty factor.

SUMMARY OF THE INVENTION

With the foregoing background of the invention in mind, it is a primary object of this invention to provide a method, suitable for use with a solid state transmitter, for encoding a high PRF waveform to produce range-Doppler resolution characteristics essentially the same as those obtained with a low PRF waveform.

The primary and other objects of this invention are attained generally by encoding a pulse train waveform in accordance with a selected one of a new class of cyclic polyphase codes. Successive pulses of a pulse train of arbitrary, but constant, PRF are encoded in accordance with the selected code for "N" pulses where "N" is the number of pulses in a code sequence and then the coding is repeated. The range-Doppler resolution characteristics of the coded signals are nearly identical to those of an uncoded pulse train at a PRF equal to 1/N times the PRF actually used. In particular, the spacing between the time ambiguities of the coded signal is increased by a factor "N" and all ambiguous responses with a lesser spacing in time are completely suppressed. The frequency ambiguity spacing is 1/N times the PRF actually used and the time response at each ambiguous frequency is identical, except for a time shift, to that at zero frequency.

BRIEF DESCRIPTION OF THE DRAWINGS

Other objects and many of the attendant advantages of this invention will by readily appreciated as the same becomes better understood by reference to the following detailed description when considered in connection with the accompanying drawings wherein:

FIGS. 1A through 1H illustrate how range and frequency ambiguities arise when a constant PRF waveform without any phase or frequency modulation is used;

FIGS. 3A and 3B are diagrams useful in showing how correlation of transmitted and received signals may be effected under different exemplary conditions according to this invention;

DESCRIPTION OF THE PREFERRED EMBODIMENTS

Referring now to FIGS. 1A through 1E, the reasons for range ambiguities with a high PRF waveform are illustrated. Thus, as shown in FIG. 1A, pulses of electromagnetic energy, propagating through space with a finite velocity (c) of $3 \times 10^8$ meters/second, are shown as pulses t1 through t7. Each successive pulse radiated from an antenna (not shown) on board a guided missile 10, therefore, requires $T_D$ seconds to reach a point at a range of c $T_D$ meters (FIG. 1B). Thus, because of the relationship between distance and elapsed time, the entire history of a pulse train waveform having seven pulses and a constant PRF waveform may be visualized as a signal pattern distributed, as shown, in FIG. 1A to be a time sequence of equally spaced pulses with pulse t1 indicating the first pulse and t7 the last. Three stationary targets (not numbered) are shown in FIG. 1B to be located, respectively, at ranges R1, R2 and R3 from the missile 10 and the instantaneous spatial distributions of the resulting target echo signals are shown in FIGS. 1C, 1D, 1E. Ranges R1, R2 and R3 are here such that target echo signals from each range arrive simultaneously at the guided missile 10 (FIG. 1A). That is, target echo signal t1e from a target at range R3 (FIG. 1E), target echo signal t2e from a target at range R2 (FIG. 1D) and target echo signal t3e from a target at range R1 (FIG. 1C) arrive simultaneously at the guided missile 10 (FIG. 1A). The three target echo signals, after processing in the guided missile 10, produce a single pulse signal, i.e. there is a range ambiguity in that target echo signals from ranges R1, R2 and R3 may not be distinguished one from the other. A moment's thought will make it clear that whenever the ranges of targets similarly differ (or when the differences are integral multiples of the difference in range between, say, R1 and R2) a range ambiguity occurs. The difference in range of targets which suffer range ambiguity is called the ambiguous range. It can be shown that the ambiguous range $R_A$ (when a constant PRF waveform is transmitted) is equal to half the distance traveled by each transmitted pulse during the time, $T_p$, between successive ones of such pulses (Or any integral multiple of such distance). Hence, $$R_A = k(c)(T_p)/2 \qquad \text{Eq. (1)}$$

where "k" is an integer and "c" is the velocity of propagation of each transmitted pulse. However, since the time, $T_p$, is the reciprocal of the pulse repetition frequency, $f_r$, (when $f_r$ is a constant)

$$R_A = k \, c/2 \, f_r \qquad \text{Eq. (2)}$$

Figures 1F, 1G, 1H:
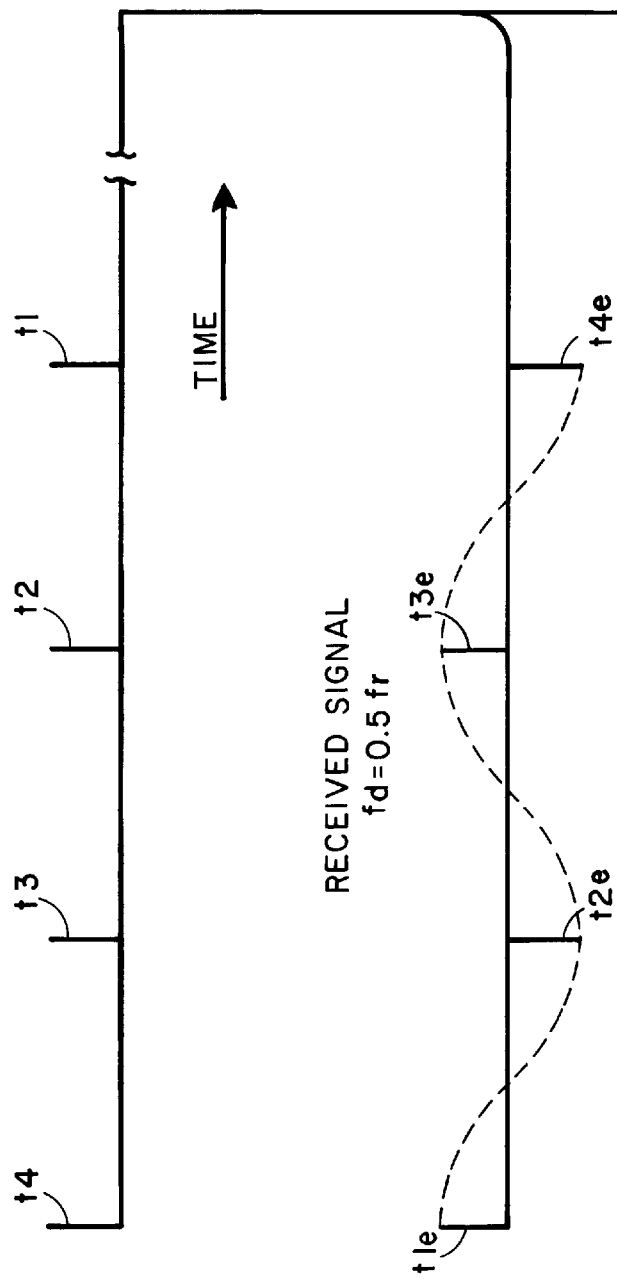

Referring now to FIGS. 1F, 1G and 1H, the causes of ambiguities which arise when echo signals (whether from targets or clutter illuminated by a constant PRF waveform wherein the frequency of each transmitted pulse is substantially the same) having different Doppler velocities are illustrated. It will first be observed that the frequency of any echo signal (whether such signal is a target echo signal or a clutter echo signal) will differ from the frequency of each transmitted pulse by an amount proportional to the radial, or Doppler, velocity of the target or clutter giving rise to the echo signal. It will also be observed that the constant PRF waveform shown in FIG. 1F may, for analytical purposes, be deemed to be a continuous wave (CW) signal which is pulse modulated to produce the illustrated train of transmitted pulses. To put it another way, it may be deemed for analytical purposes that the constant PRF waveform transmitted is an assumed CW signal multiplied by a video pulse train corresponding to the constant PRF waveform. With such assumptions, it follows that processed (or baseband) echo signals such as those shown in FIGS. 1G and 1H may be deemed to be the assumed CW signal transmitted (modified, of course, by any Doppler shift) multiplied by the constant PRF waveform. Assumed CW baseband signals with different Doppler shifts are shown in dotted line (not numbered) in FIGS. 1G and 1H. The solid vertical lines in FIGS. 1G and 1H, labeled t1, t2, t3 and t4, are the baseband video pulses corresponding to the pulses (marked t1, t2, t3 and t4 in FIG. 1F) in the constant PRF waveform reflected from two targets at the same range but with different Doppler velocities. In particular, the baseband CW signal in FIG. 1G represents an assumed transmitted CW signal with a Doppler shift, $f_d$, equal to 0.5 $f_r$, where "$f_r$" is the pulse repetition frequency of the constant PRF waveform actually transmitted and the baseband CW signal in FIG. 1H represents the same assumed transmitted CW signal after a Doppler shift of 2.5 $f_r$. It will be observed, however, that there is no discernible difference between the baseband video pulses of FIGS. 1G and 1H. To put it another way, in the illustrated examples, Doppler shifted CW signals may be distinguished whenever the baseband CW signals differ in frequency, but two constant PRF waveforms produce the same baseband video pulses when $$f_d(1) - f_d(2) = k\, f_r \qquad \text{Eq. (3)}$$

where $f_d(1)$ is the Doppler shift of the first constant PRF waveform $f_d(2)$ is the Doppler shift of the second constant PRF waveform k is an integer $f_r$ is the pulse repetition frequency. When Equation (3) obtains, a frequency, or Doppler, ambiguity exists.

It is common practice to describe range and frequency ambiguities in a so-called radar ambiguity function to describe the signal properties of any given waveform transmitted by a radar. That is to say, with the radar ambiguity function of a particular waveform known, properties other than range and frequency ambiguities may be determined. For example, the resolution of the radar and the ability to reject clutter may be determined. Further, with the radar ambiguity function of a particular waveform known, it is possible, within modest limits, to modify the waveform to optimize some chosen signal property. As is well known, however, if the waveform is modified to improve one signal property, as, for example, to increase the range ambiguity, a concomitant decrease in another signal property (in this case a decrease in the frequency ambiguity) must be acceptable.

Figure 2A:
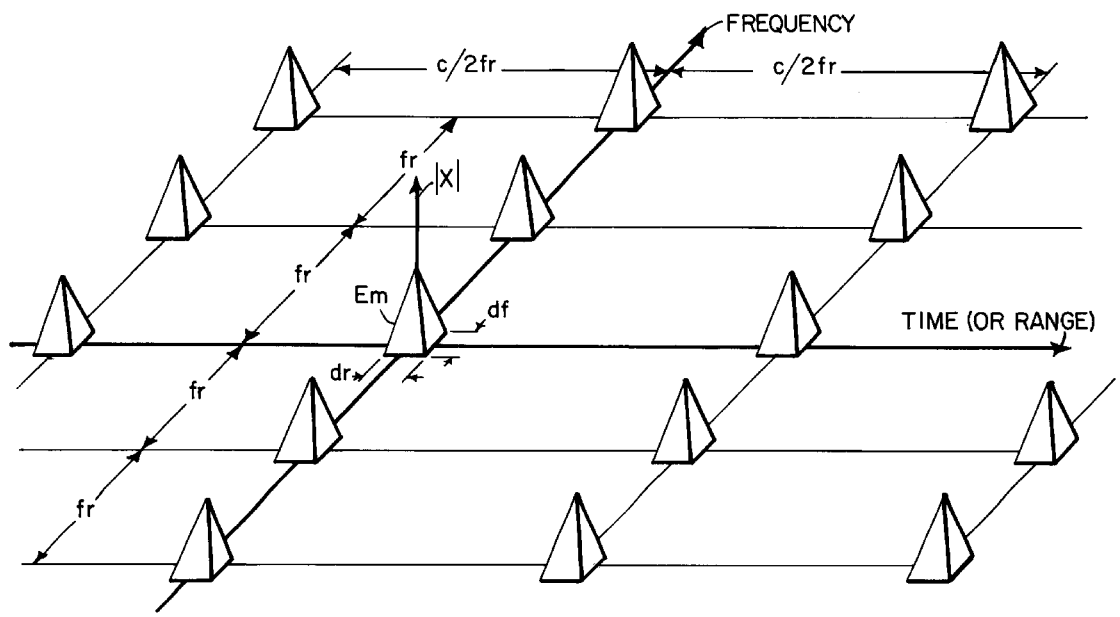
FIG. 2A is a sketch illustrating the radar ambiguity function of a waveform such as is used in FIGS. 1A through 1H.

Referring now to FIG. 2A, an idealized three dimensional radar ambiguity function is illustrated for the case when a constant PRF waveform is transmitted and the resulting train of echo signals is coherently integrated (meaning that the receiver used constitutes a matched filter for the constant PRF waveform). In FIG. 2A, the coordinates are marked |X| (meaning amplitude), frequency and time (or range) so that the pyramidal forms (not marked except for the pyramidal form marked "Em") approximate the distribution of the range and frequency ambiguities with the pyramidal form Em representing the optimum response of the receiver. The base of the pyramidal form Em is dimensioned as shown, i.e. by "dr" and "df", to indicate the spread in range and bandwidth of the frequencies which may be match filtered in the receiver. The distance measured from any point on the base of the pyramidal form Em to the sloping surface of that form represents the weight accorded to energy at the indicated frequency received at the indicated time. The unmarked pyramidal forms are similarly dimensioned.

It will be observed that the unmarked pyramidal forms are located on a grid dimensioned to be compatible with Eq. (2) and Eq. (3). This means that if the spacing between the unmarked pyramidal forms is changed in one direction in the grid an inverse change must be suffered in the grid. That is to say, if, for example, the rate of the constant PRF waveform is decreased to increase the frequency, or Doppler, ambiguity the ambiguous range becomes smaller. It will also be observed that any return signal having what may be termed a "time-frequency" signature which is outside any of the pyramidal forms is, in effect, eliminated from the output of the receiver. To put it another way, the radar ambiguity function being discussed simultaneously provides range and frequency resolution along with considerable clutter rejection, but suffers from range and frequency ambiguities which may not be satisfactorily modified to optimize the radar ambiguity function for active pulse radars used in guided missiles where it is difficult, if not impossible, to change the repetition Tate at which "state-of-the-art" solid state oscillators may be operated.

Figure 2B:
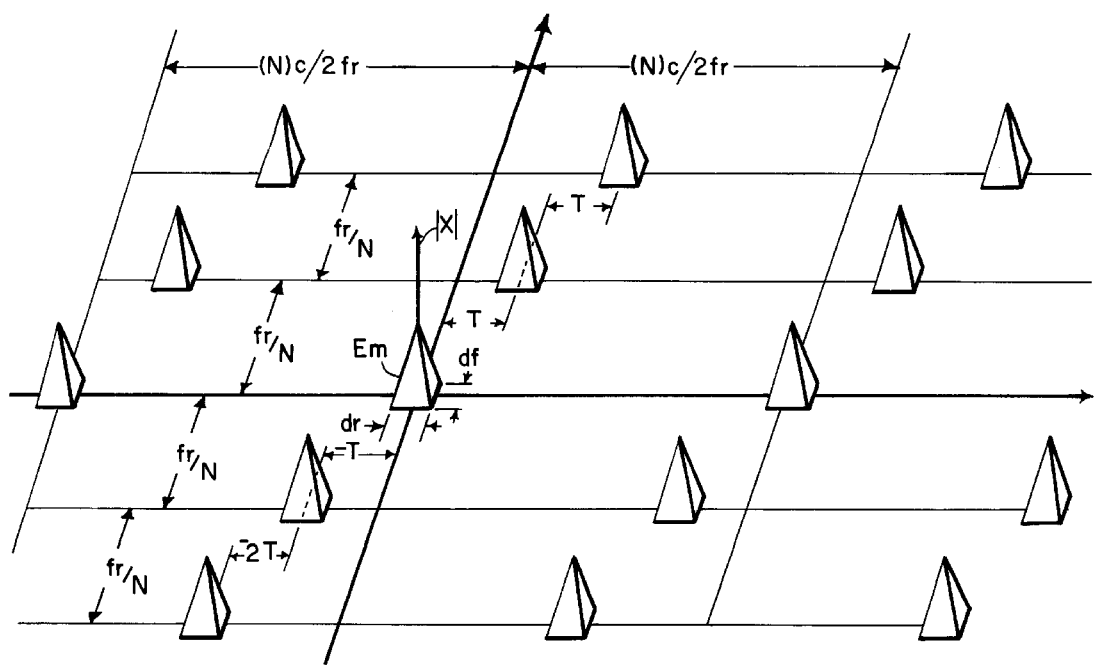
FIG. 2B is a sketch illustrating the radar ambiguity function of a polyphase coded constant PRF waveform according to this invention.

Referring now to FIG. 2B, a radar ambiguity function in accordance with this invention is shown. It will be evident that the contemplated radar ambiguity function illustrated in FIG. 2B is similar to that of FIG. 2A except that the range and Doppler ambiguities represented by the unmarked pyramidal forms removed from the time, or range, coordinate are shifted as indicated by multiples of "T".

The radar ambiguity function shown in FIG. 2B is attained here by: (a) producing a constant PRF waveform at a high pulse repetition frequency; (b) phase shifting the radio frequency energy in each pulse of a selected number, N, or successive pulses in accordance with Eq. (4) below; and (c) passing received signals through a matched filter.

$$\phi_n = c(180)n^2/N + d(180)n/N \qquad \text{Eq. (4)}$$

where $\phi_n$ = the phase shift, in degrees, applied by the code to the nth pulse of a code sequence N = number of pulses in a code sequence;

c and d are integers; the sum of c and d is even when N is odd; and d is even when N is even, and, unless serradyning is desired d equals zero.

The cyclic code hereinafter sometimes referred to as the polyphase code) according to Eq. (4) may be applied to successive pulses in a pulse train having any PRF, with the sequence repeated periodically. The resulting so-coded signal possesses signal properties nearly identical to those of a pulse train with a PRF equal to 1/N times that actually used. Therefore, the spacing between the time, or range, ambiguities of the transmitted waveform will be increased by a factor N and all range ambiguities due to the actual PRF are completely suppressed. The spacing of the frequency ambiguities will be 1/N times the PRF but the time (range) response at each ambiguous frequency will be differently displaced in time as shown in FIG. 2B.

The properties of the polyphase codes covered by this invention can be illustrated by examining the phase sequences generated by this technique. Several of these sequences, with the phases given modulo 360°, are presented in TABLE I. It is noted that the phase sequences were generated with c=1 and d=0 in Eq. (4).

TABLE I

| | Phase Sequence (In Degrees) of Pulses in Code | | | | | | | | | | | | |
|---|---|---|---|---|---|---|---|---|---|---|---|---|---|
| N | 0 | 1 | 2 | 3 | 4 | 5 | 6 | 7 | 8 | 9 | 10 | 11 | 12 |
| 2 | 0 | 90 | 0 | 90 | 0 | 90 | 0 | 90 | 0 | 90 | 0 | 90 | 0 |
| 4 | 0 | 45 | 180 | 45 | 0 | 45 | 180 | 45 | 0 | 45 | 180 | 45 | 0 |
| 6 | 0 | 30 | 120 | 270 | 120 | 30 | 0 | 30 | 120 | 270 | 120 | 30 | 0 |
| 10 | 0 | 18 | 72 | 162 | 288 | 90 | 288 | 162 | 72 | 18 | 0 | 18 | 72 |
| 12 | 0 | 15 | 60 | 135 | 240 | 15 | 180 | 15 | 240 | 135 | 60 | 15 | 0 |

It may be inferred from TABLE I that all the polyphase codes in which "N" equals an even integer are symmetric around their centers, halving the number of phase states required to implement any one of such codes. Further, for polyphase codes of length $N=2^b$, with b an integer, it can be seen from TABLE I and also from Eq. (4) that a digital phase shifter with (b+1) bits (i.e., a device in which switchable phase increments of 360° divided by (b+1) integral powers of 2 are connected in cascade) will produce every one of the required phase states for any one of the polyphase codes.

Figure 3A:
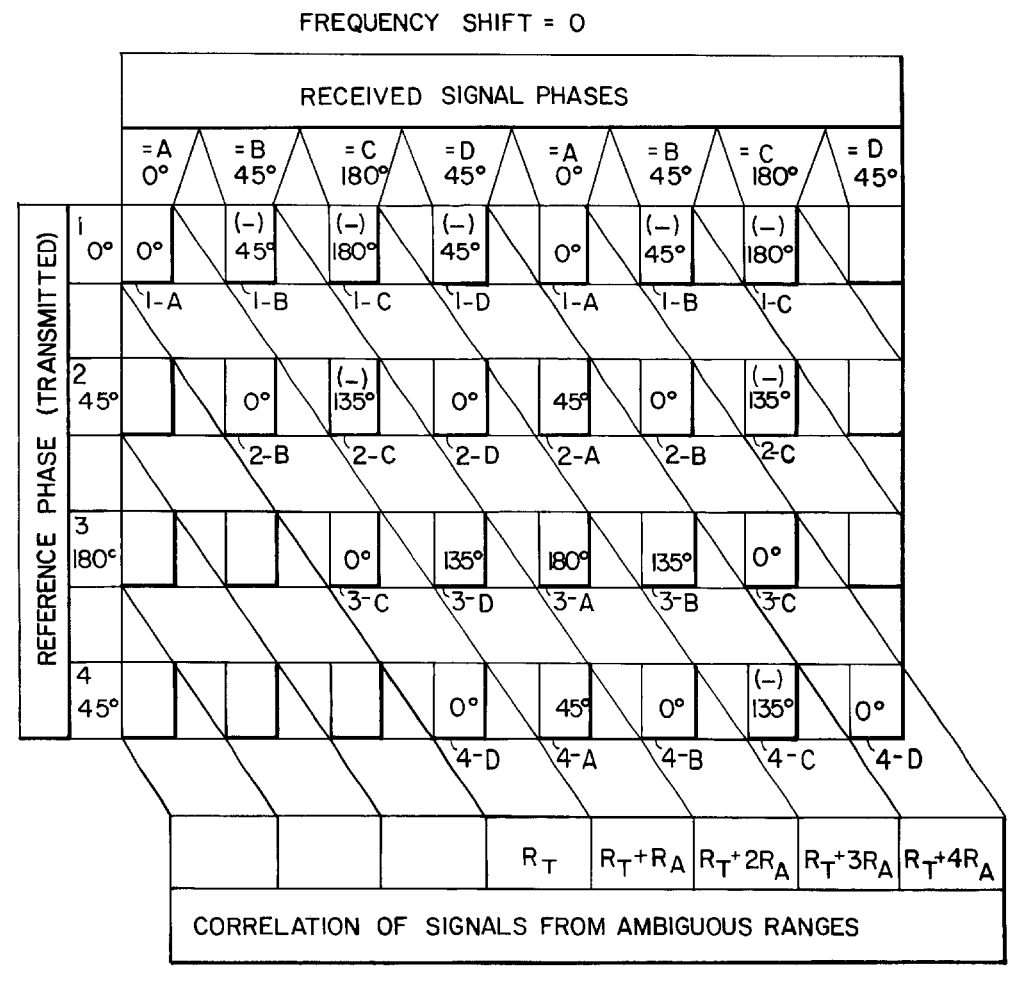
Figure 3B:
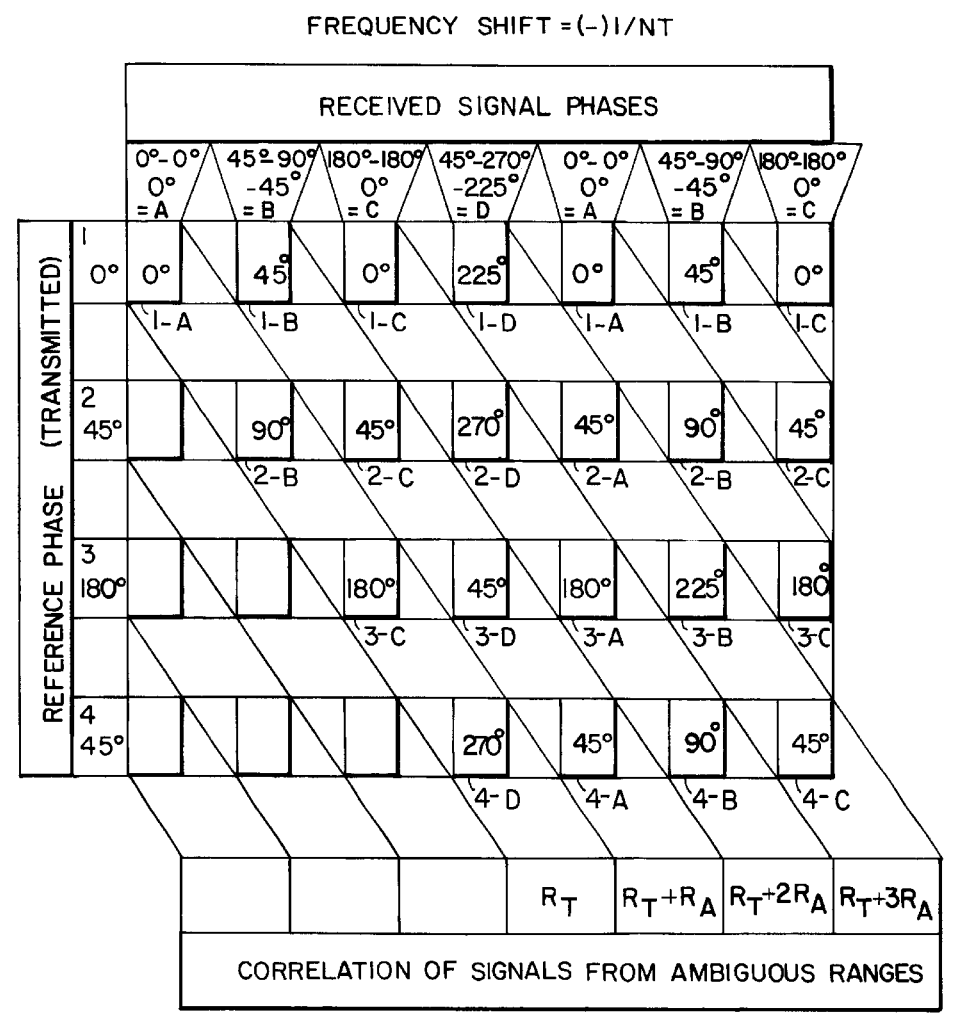

Referring now to FIGS. 3A and 3B, the manner in which the ambiguity peaks shown in FIG. 2B are shifted in time may be seen for the case in which the transmitted polyphase code has a length of four pulses. That is, the phase (relative to the first transmitted pulse in each train of four) of each successive transmitted pulse, is, as shown in TABLE I, 0°, 45°, 180°, 45°. FIG. 3A shows the phase relationships which exist between each received echo signal from any reflector at a given range and having a given Doppler velocity (meaning the echo signal for which the receiver (not shown) is matched) such signal being represented by the pyramidal form Em in FIG. 2B. FIG. 3B shows the phase relationships which exist between each received echo signal from a reflector actually at the same range as the one assumed for FIG. 3A but with a Doppler shift equal to the pulse repetition frequency of the transmitted constant PRF waveform modulated by the selected polyphase code.

Before further discussing FIGS. 3A and 3B, it will be appreciated that the receiver (not shown) which constitutes a matched filter here is one known in the art to be a so-called correlation receiver wherein received signals from echo sources at a given range are processed after reception, inter alia, by multiplication with the modulation signal on the corresponding transmitted signal and integrating the product signals. The multiplication process is effective to subtract the phase of the received signal from the phase of the corresponding transmitted signal.

With the foregoing in mind, inspection of FIG. 3A shows that the phase difference between successive processed signals indicative of a reflector at the selected range with the selected Doppler shift is always zero with respect to the phase of the reference signal. To put it another way, the first received pulse in each train of four pulses is in phase with the first reference pulse in each train of pulses, the second received pulse with the second reference pulse, the third received pulse with the third reference pulse and the fourth received pulse with the fourth reference pulse. On the other hand, correlation between each received pulse and other reference pulses.(as shown in FIG. 3A in the sloping channels headed by "45°", "180°" and "45°" under "RECEIVED SIGNAL PHASE" causes the phase of the processed signals to be integrated to change as indicated. The result then is that the integration process produces a sensible result (the sum of four "in phase" signals) corresponding to the correlation of each received pulse with the corresponding reference pulse.

Additionally, correlation in an unwanted manner, i.e. for example the second received pulse with reference pulses other than the second reference pulse, sums to zero after integration. In FIG. 3B the factor "k" (Eq. (1) or Eq. (2)) is equal to "4", meaning that the ambiguous range here is four times the ambiguous range experienced with the unmodulated PRF waveform having the same pulse repetition frequency shown in FIG. 3A.

FIG. 3B shows the phase relationships between the reference pulses with the contemplated polyphase code and received pulses from a reflector having a Doppler velocity to cause a Doppler shift of $f_r$ (Hz) between the beginning and the end of each code sequence of four pulses. With four equally spaced pulses in each code sequence the phases of the received pulses in FIG. 3B differ as shown from the phases of the received pulses in FIG. 3A because of the different Doppler shift. Inspection of FIG. 3B shows that correlation of the second received pulse with the first reference pulse, the third received pulse and the second reference pulse, the fourth received pulse and the third reference pulse and the fifth (i.e. the first pulse in the next sequence) received pulse and the fourth reference pulse produce pulses at range $R_T+R_A$ that are "in phase" with one another. Such pulses, when integrated, produce a sensible signal at $R_T+R_A$. It will be observed also that for signals from $R_T$, $R_t-R_A$ and $R_T\pm2A$ the differences in phase between the signals to be integrated render the then occurring integrations insensible.

It will now be appreciated that when a contemplated polyphase code is used, an ambiguity structure similar to that of a waveform of 1/N times the PRF can be produced without altering the modulation envelope of the transmitter.

Having described the problem which is addressed by the present invention and the way in which a particular polyphase code changes the radar ambiguity function of a constant PRF waveform, the contemplated method will now be clear. Thus, to be specific, the contemplated method encompasses the steps of: (a) providing a plurality of polyphase codes formed in accordance with Eq. (4); (b)

modulating a constant PRF waveform in accordance with a selected one of the polyphase codes, the particular one of such codes which is selected being that code which is best fitted to operation in the then existing environment; (c) correlating the return signals from a selected range with a reference signal comprising a PRF waveform corresponding to the coded constant PRF waveform transmitted; and (d) integrating the correlated signals to provide a desired signal and to reduce the effects of unwanted range and Doppler ambiguities.

Figure 4:
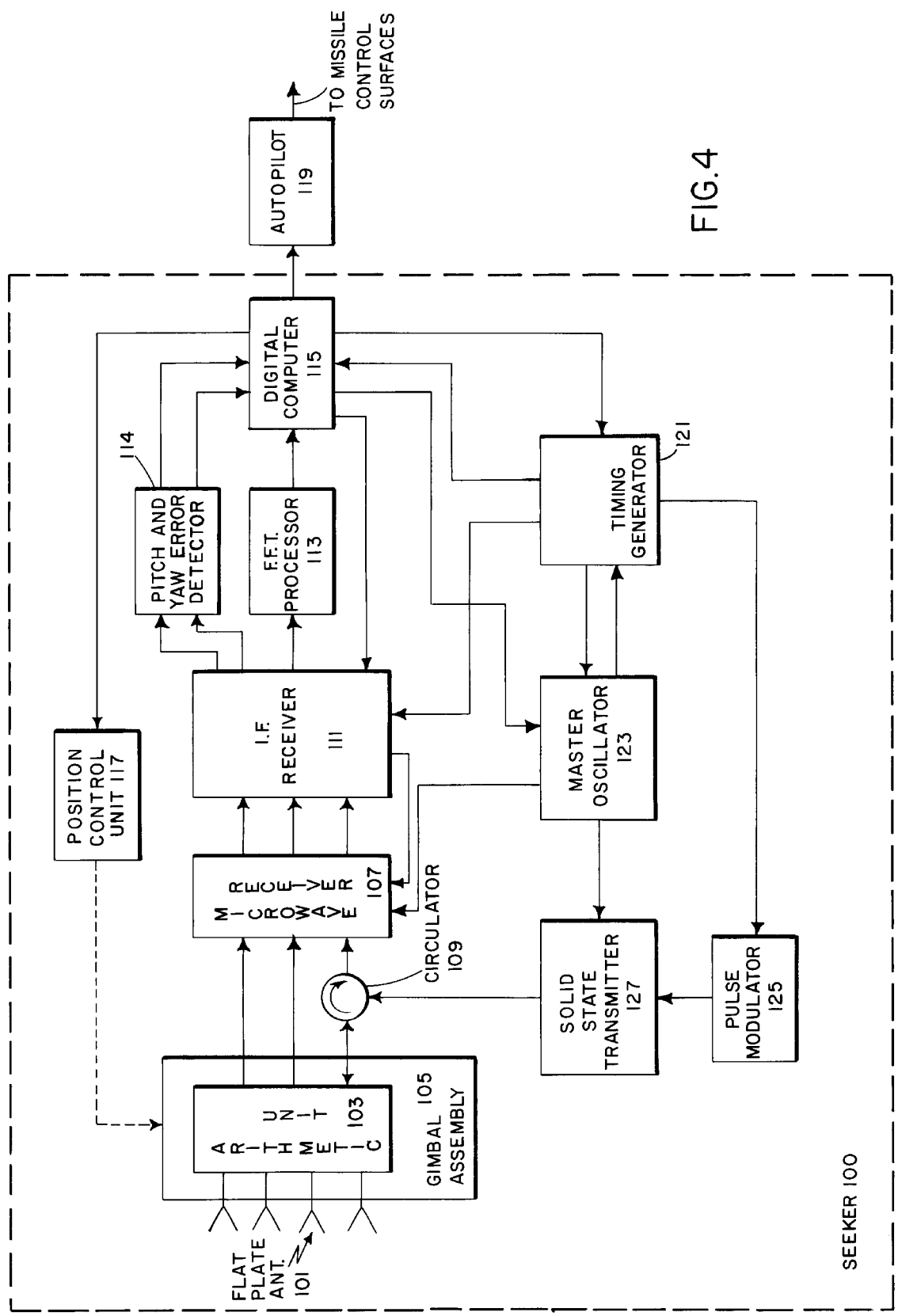
FIG. 4 is a simplified block diagram of an active seeker for a guided missile, such seeker incorporating a pulse radar operated according to this invention.

Referring now to FIG. 4, exemplary apparatus to carry out the contemplated method is shown. Thus, in FIG. 4 an active radar seeker 100, employing a polyphase coded waveform to provide the effects of variable PRF without actually changing the PRF of a constant PRF waveform transmitted, is shown to include a flat plate antenna 101 and a monopulse arithmetic unit 103, both of which are mounted on gimbal assembly 105. Monopulse pitch and yaw error signals developed within the monopulse arithmetic unit 103 are passed, via rotary joints (not shown), directly to a microwave receiver 107 while the monopulse sum signal is passed to the microwave receiver 107 via a rotary joint (not shown) and a circulator 109. The microwave receiver 107 will be described in greater detail hereinbelow; suffice it to say here that that receiver is effective to provide both preamplification and downconversion of the monopulse sum signal along with the monopulse pitch and yaw signals to a first intermediate frequency (I.F.) of, say, 300 MHz. Such I.F. signals are passed to an I.F. receiver 111 which is here of conventional design and which performs the functions of range gating and automatic gain control (AGC), downconversion to a second I.F. of 30 MHz, and downconversion of the I.F. signals to baseband bipolar video in-phase (I) and quadrature phase (Q) signals. In accordance with the method contemplated here, the received signals being processed are correlated with an appropriately delayed signal analogous to the particular polyphase code being transmitted. The resulting baseband bipolar video signals derived from the monopulse sum signal are then (after conversion to a digital format) passed to a Fast Fourier Transform, FFT signal processor 113. That processor may, for example, be similar to the one described in Shapiro et al, U.S. Pat. No. 3,875,391 issued Apr. 1, 1975 and assigned to the same assignee as the present application, It is noted here that, as explained heretofore in connection with FIG. 3B, the correlation process causes the unwanted Doppler ambiguities to be shifted in time, so signals having such origins are, in effect, not seen by the FFT signal processor 113. The FFT signal processor 113 operates in a known manner to analyze the frequency spectrum of the baseband bipolar video signals effectively applied to it and to produce signals indicative of the amplitude of the various components in such baseband bipolar video signals. The pitch and yaw error signals out of the I.F. receiver 111 are passed to a pitch and yaw error detector 114 (which may, for example, be a pair of synchronous detectors) to produce pitch and yaw error signals in any conventional manner. The latter signals (after conversion in any convenient manner to a digital format) are applied, along with the output of the FFT signal processor 113, to a digital computer 115. Such computer may, for example, be similar to the one shown in U. S. Pat. No. 4,037,202, inventor John Terzian, issued Jul. 19, 1977 and assigned to the same assignee as the present application. The digital computer 115 is, in response to the pitch and yaw error signals, effective to produce appropriate command signals for a position control unit 117, an autopilot 119, a timing generator 121 (FIG. 4) and a master oscillator 123 (FIGS. 4B and 4C). The first two of the just-named elements are conventional and are effective, respectively, to position the gimbal assembly 105 and to develop control signals for the missile control surfaces (not shown) as required. The timing generator 121 is operative, inter alia, to produce a selected one of the polyphase codes as needed in transmission and reception and to control a conventional pulse modulator 125. The master oscillator 123, to be described hereinafter, is operative, inter alia, to control the frequency of a conventional solid state transmitter 127.

Figure 4A:
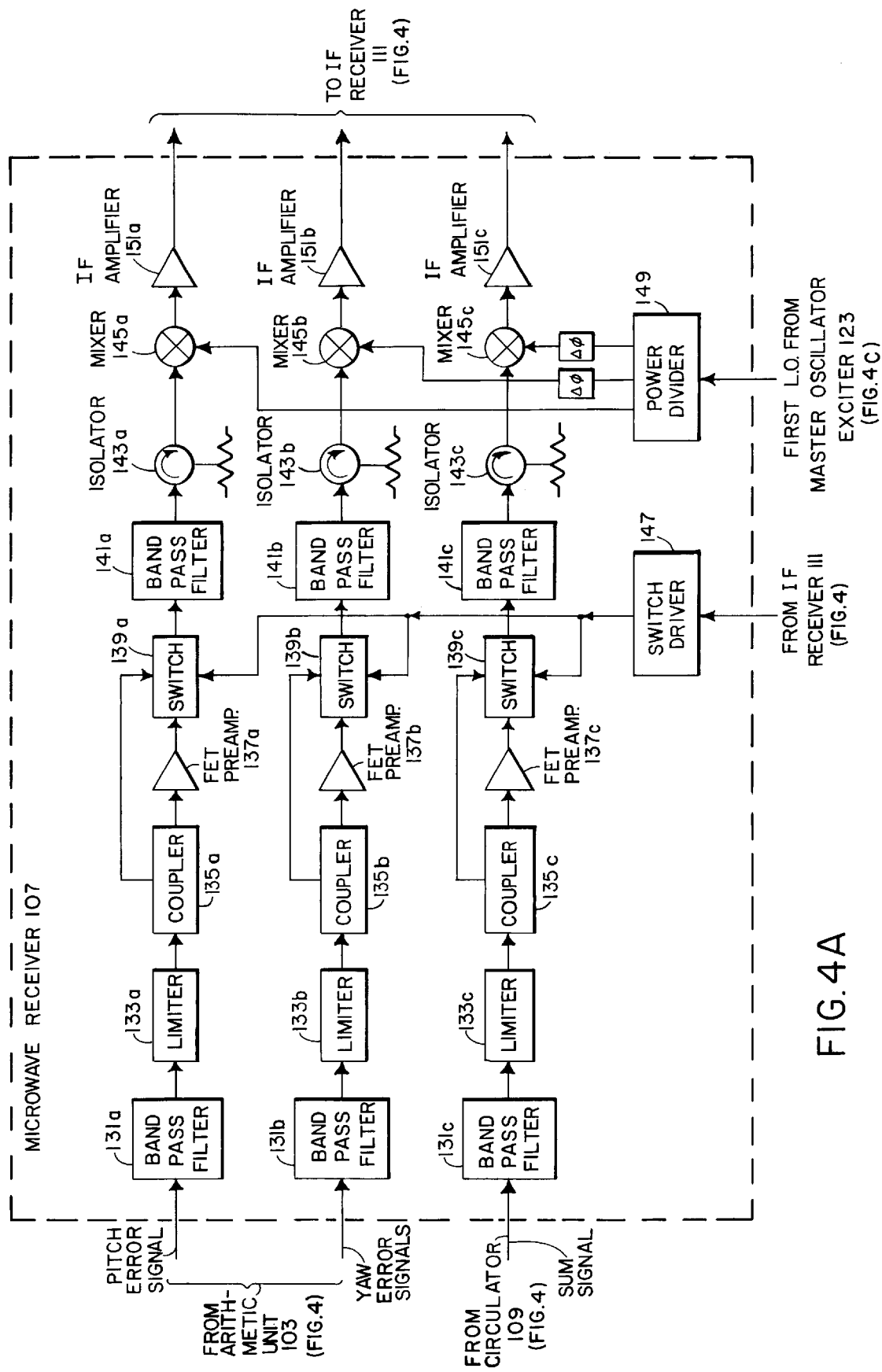
FIG. 4A is a simplified block diagram of the microwave receiver in the radar of FIG. 4, such receiver being adapted to correlate polyphase coded echo signals from any given range with similarly coded transmitted signals.
Figure 4B:
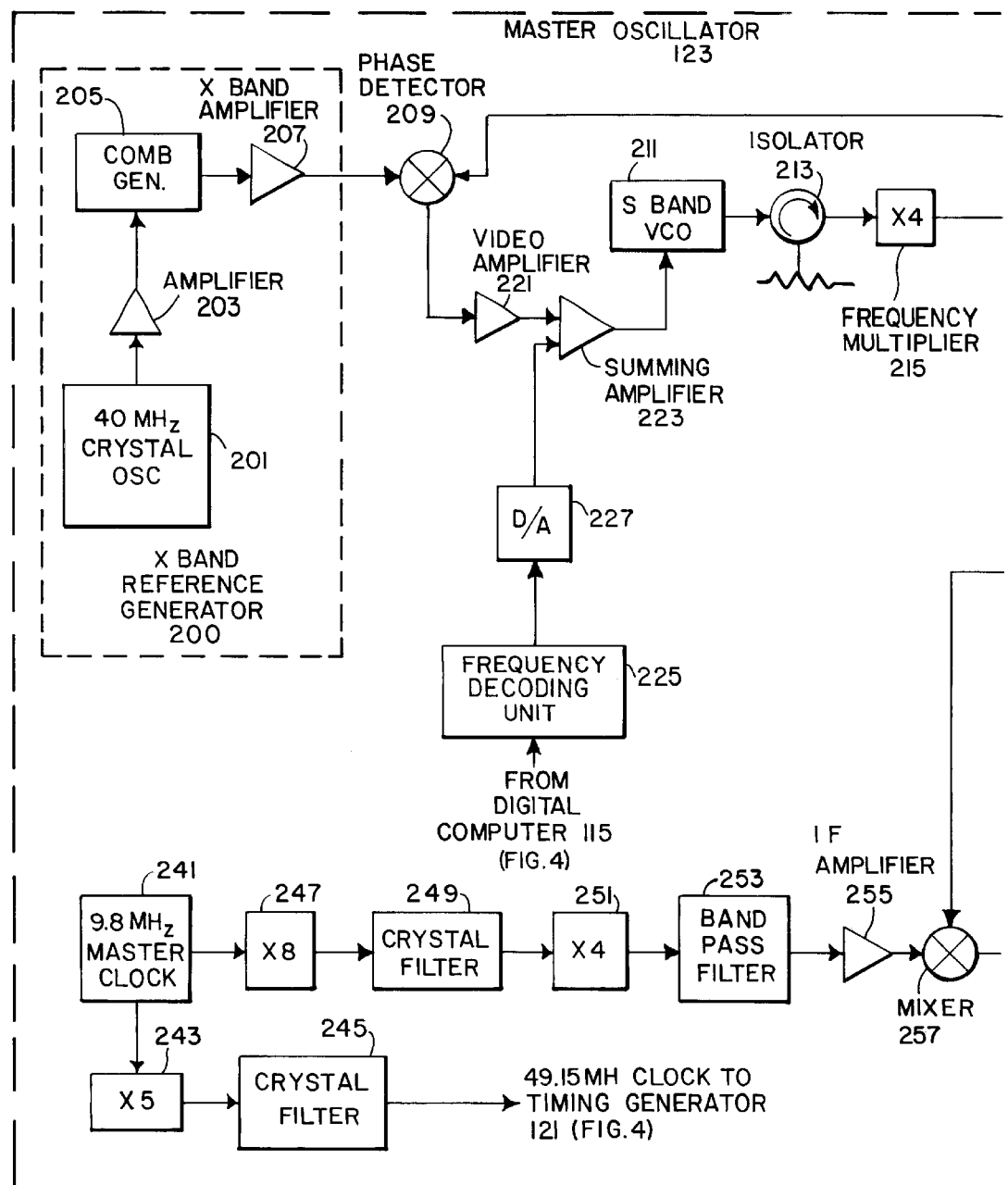
FIGS. 4B and 4C, taken together, constitute a simplified block diagram of a master oscillator for the pulse radar of FIG. 4.
Figure 4C:
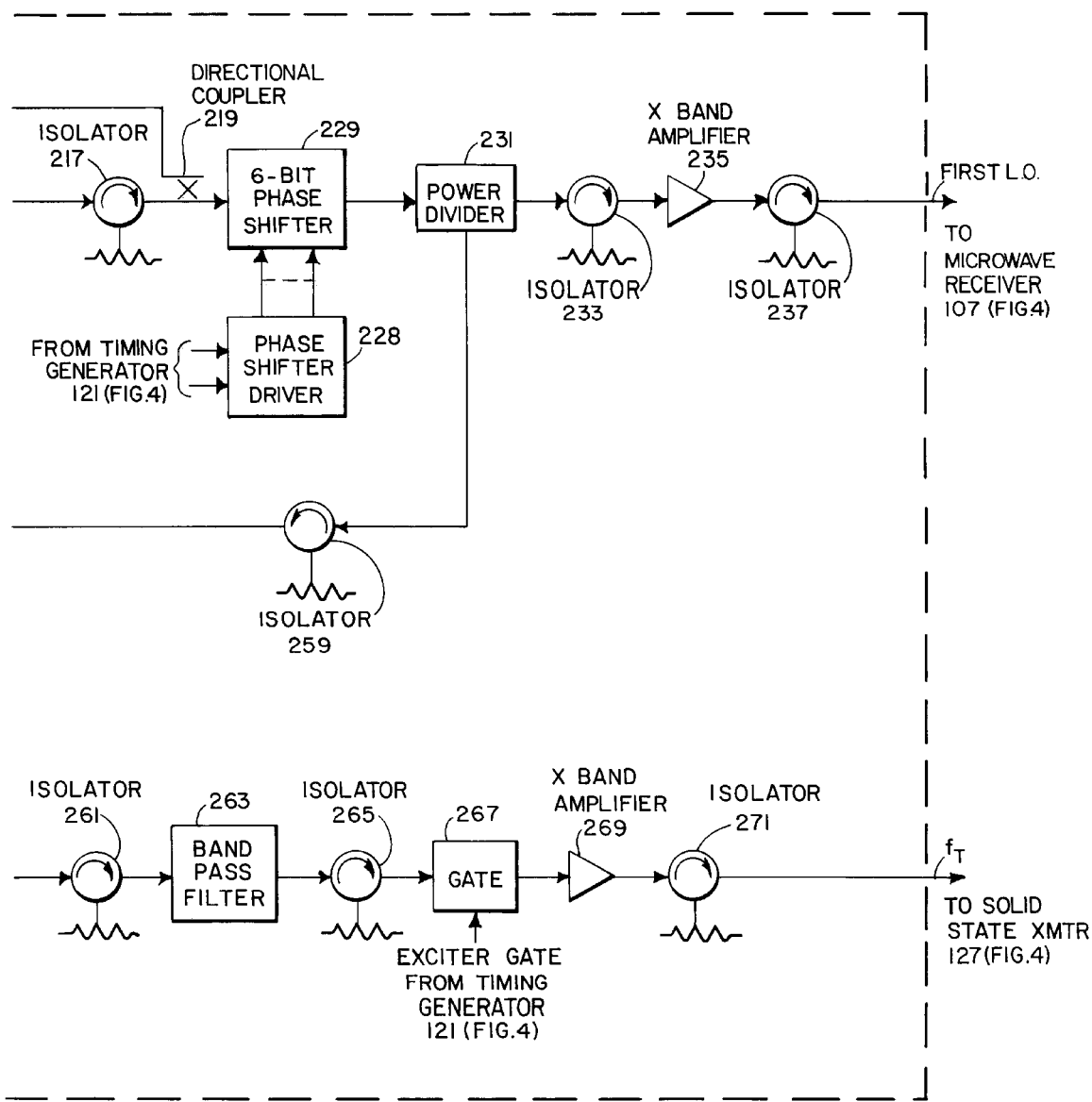

Referring now to the details of the microwave receiver 107 in FIG. 4A, the monopulse sum and error signals are passed, as shown, through bandpass filters 131a, 131b and 131c wherein "out of band" signals are rejected. The resulting filtered signals are passed, via limiters 133a, 133b and 133c, to 20 db couplers 135a, 135b and 135c, each of which couples a portion of the corresponding one of the resulting filtered signals to one of the switches 139a, 139b and 139c. The remaining portions of the resulting filtered signals, i.e. the direct, or low loss, signals from couplers 135a, 135b and 135c are also passed, via field effect transistor preamplifiers (labeled FET preamps 137a, 137b and 137c) to switches 139a, 139b and 139c. The latter are controlled by a switch driver 147 which receives a control signal from a conventional AGC control logic unit (not shown but located within I.F. receiver 111 (FIG. 4)). The gain of each of the FET preamps 137a, 137b, 137c here is 16 db. It follows then that the overall gain of the microwave receiver 107 is dependent upon the level of the AGC control signal; when the filtered signals are passed through the FET preamps 137a, 137b, 137c the noise figure of the microwave receiver 107 is 3.6 db. The filtered signals are then passed, via filters 141a, 141b, 141c (which reduce the image noise contribution of the FET preamps 137a, 137b and 137c)and isolators 143a, 143b and 143c to mixers 145a, 145b and 145c, here single balanced mixers. The second input signals to each such mixer, which signals are offset in frequency by 300 MHz from the filtered signals being processed, are obtained from the master oscillator 123 (FIGS. 4B and 4C) via a power divider 149. It is noted here in passing that phase trimmers (not numbered) are included in the paths from the power divider 149 to the mixers 145b and 145c to equalize the phase shifts suffered by the signal from power divider 149 to mixers 145a, 145b, 145c so that such elements are effective to downconvert the filtered signals to first I.F. signals at a first I.F. frequency of 300 MHz. The first I.F. signals are then amplified in I.F. amplifiers 151a, 151b and 151c prior to being passed to the I.F. receiver 111 (FIG. 4).

Referring now to FIGS. 4B and 4C, the portion (not numbered) of the master oscillator 123 which provides the first local oscillator signals to mixers 145a, 145b, 145c (FIG. 4A) is shown to include an X-band reference generator 200 which includes a crystal-controlled oscillator 201 (here operating at 40 MHz), an amplifier 203, a comb generator 205 and an X-band amplifier 207 to produce a reference signal at X-band. Such reference signal is applied as a first input signal to a phase detector 209. The second input signal to such detector is obtained from a voltage-controlled oscillator 211 (operating at S-band and hereinafter referred to simply as S-band VCO 211) via an isolator 213, frequency multiplier 215 (here a step recovery diode to multiply the output of the S-band VCO 211 by a factor of four), an isolator 217 and a directional coupler 219. The output signal from the phase detector 209 is applied, via a video amplifier 221 and a summing amplifier 223, to the S-band VCO 211. It will now be appreciated by those of skill in the art that the just described elements form a phase lock loop to control the frequency of the S-band VCO 211. It is noted here in passing that a second control voltage is also applied to the summing amplifier 223. Such control voltage is provided by the digital computer 115 (FIG. 4), via a frequency decoding unit 225 and a digital-to-analog converter 227 and a switch (not shown), initially to set the frequency of the S-band VCO to a frequency such that the input signals to the phase detector 209 are approximately equal in frequency.

The direct signal from directional coupler 219 is passed to a phase shifter 229, here a conventional six bit digital phase shifter adapted to switching and settling in less than fifty nanoseconds with a phase accuracy of ±5.6 ($\pi/32$) degrees. The requisite switching commands are provided to the phase shifter driver 228 (which is here of conventional design) by the timing generator 121 (FIG. 4), in response to the selected code provided by the digital computer 115 (FIG. 4). That is to say, depending upon the environment encountered in operation, a particular polyphase code required to simulate a desired PRF is finally impressed on the phase shifter 229.

The phase coded output signal from the phase shifter 229 is passed to a power divider 231 wherein it is split. A first portion of such signal is passed, via an isolator 233, an X-band amplifier 235 and an isolator 237, to the power divider 149 (FIG. 4A). Thus, a polyphase coded first local oscillator signal is generated for the mixers 145a, 145b, 145c (FIG. 4A). The time at which such signal is generated is, of course, dependent upon the range at which a desired target is located and is determined by the timing of the signal from the timing generator 121 (FIG. 4).

The second portion of the output of the power divider 231 is passed, via an isolator 259, to the exciter portion (not numbered) of the master oscillator 123. The basic frequency determining element in such exciter portion is shown to be a master clock 241 here operating at 9.37 MHz. Such clock is shown to provide two outputs, the first of which is multiplied by a factor of 5 in a frequency multiplier 243 and then, after being passed through a crystal filter 245, is passed to the timing generator 121 (FIG. 4) as a 46.85 MHz clock signal. The second output signal from the master clock 241 is multiplied by a factor of 8 in a frequency multiplier 247, then, after being passed through a crystal filter 249 is multiplied by a factor of 4 in a frequency multiplier 251, and then, after being passed through a bandpass filter 253 ultimately provides an I.F. signal at 300 MHz. Such I.F. signal is amplified in I.F. amplifier 255 prior to being applied as a reference signal to a mixer 257. The second input to the latter is the polyphase coded X-band signal obtained from the power divider 231, via an isolator 259. A component of the output of the mixer 257 is at a frequency, $f_r$, equal to the sum of the polyphase coded X-band signal and the reference I.F. signal at 300 MHz. The signal from mixer 257 is passed, via an isolator 261, to a bandpass filter 263 which is tuned to the frequency $f_r$. The output signal from such filter is passed, via an isolator 265, to a gate 267. The gate 267 is controlled by an EXCITER GATE pulse obtained from the timing generator 121 (FIG. 4) and is effective to gate OFF the solid state transmitter 127 during the receive mode of operation. The output signal from the gate 267 is amplified in an X-band amplifier 269 and passed, via an isolator 271, as an input signal to the solid state transmitter 127 (FIG. 4).

In order to effect correlation with an echo signal a target at any desired range, it is, of course, necessary to compensate for the interval between the time of transmission of each coded signal and reception of the desired echo signal. Such compensation here is accomplished in a manner to be described in connection with FIG. 4D. Suffice it to say now that, in the receive mode, the proper polyphase coded first local oscillator signal is applied at the proper moment to the mixers 143a, 143b and 143c (FIG. 4A) so that the outputs of such mixers are I.F. waveforms with a phase history determined by the instantaneous difference between the phases of the echo signal from a target at any desired range and the first local oscillator (L.O.) signal. That is, when correlation is achieved with the echo signal from a target at the desired range the resulting I.F. waveform will be indistinguishable from that produced by an uncoded constant PRF waveform. However, after correlation with the echo signal from any target at a range differing from the desired range as indicated in Eq. (2), the resulting I.F. phase shifts between successive received echo signals are cancelling pairs as described hereinabove with reference to FIG. 3B.

Figure 4D:
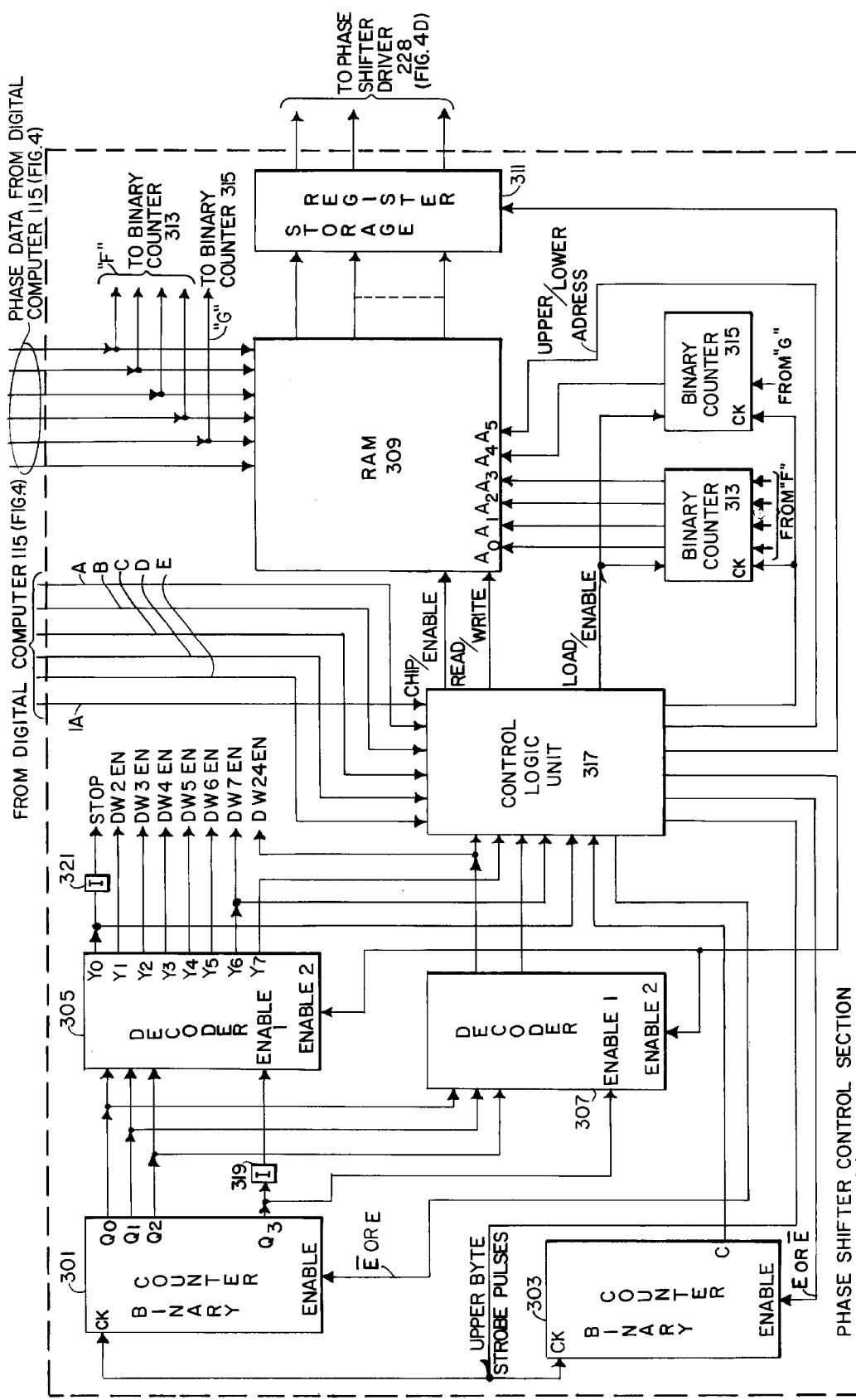
FIG. 4D is a simplified block diagram of a phase shifter control section in the pulse radar of FIG. 4.
Figure 5A:
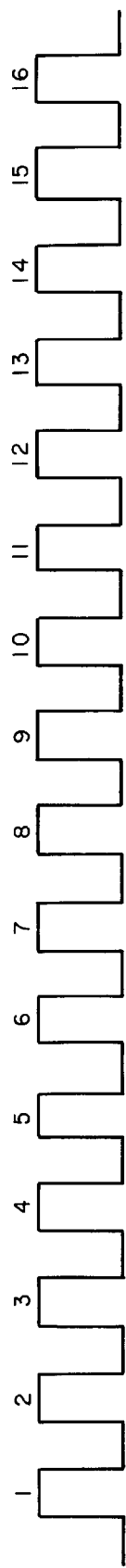
FIGS. 5A through 5F are timing diagrams useful in understanding the operation of the phase shifter control section shown in FIG. 4D.
Figure 5B:
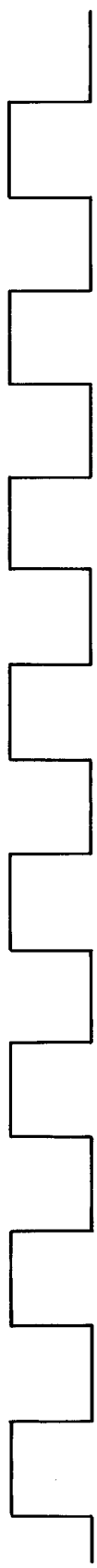
Figure 5C:
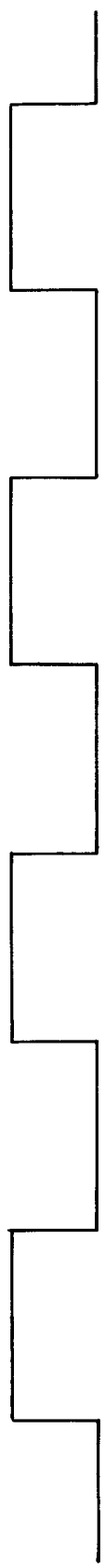
Figure 5D:
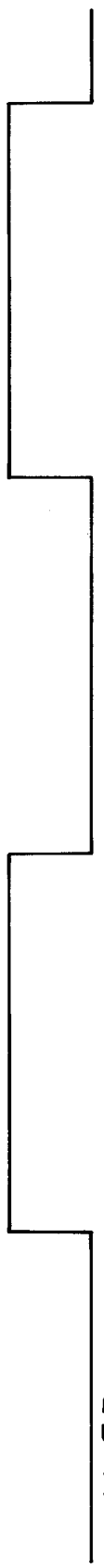
Figure 5E:
Figure 5F:

Referring now to FIG. 4D, the phase shifter control section 300 of the timing generator 121 (FIG. 4) is shown to include a first pair of binary counters 301, 303, a pair of decoders 305, 307, a random access memory (RAM 309), a storage register 311 and a second pair of binary counters 313, 315, all of which are under the control of a control logic unit 317. The latter is simply a conventional arrangement of logic gates responsive to the plurality of input signals to be described to produce the various required control signals also to be described. It is noted here in passing that all data from the digital computer 115 (FIG. 4) to the timing generator 121 (FIG. 4) is sent in blocks of forty words. Each of the forty words is sixteen bits in length, arranged in two bytes (an upper and lower byte of eight bits each). The transmit and receive mode polyphase codes are contained in thirty-two words of each block of forty words. Thus, here sixteen transmit phase code words correspond to thirty-two bytes, each byte containing the requisite commands for the phase shifter 229 (FIG. 4B) to encode each pulse in a thirty-two pulse code sequence.

The polyphase code from the digital computer 115 (FIG. 4) is shown to be applied directly to the RAM 309. Such code is also shown to be applied to binary counters 313 and 315 for reasons which will be explained hereinafter. The digital computer 115 (FIG. 4) also provides an UPPER BYTE LOAD pulse, a LOWER BYTE LOAD pulse, transmit and receive phase clock pulses and a TIMING GENERATOR ENABLE pulse on lines A, B, C, D and E, respectively, which pulses are applied to the control logic unit 317. The UPPER BYTE LOAD and LOWER BYTE LOAD pulses are processed within the control logic unit 317, ultimately to provide upper and lower byte strobe pulses. The upper byte strobe pulses are provided as clock pulses to the binary counters 301 and 303. It is noted here in passing that as the data input terminals (not shown) of the binary counters 301 and 303 are all tied together to ground such terminals are all at the "logical 0" level. The $Q_3$ output signal from binary counter 301 is supplied as an ENABLE 1 signal to the binary decoder 307 and, through an inverter 319, to the binary decoder 305. Thus, initially, the ENABLE 1 signal to the binary decoder 307 is a "logical 0" and the ENABLE 1 signal to the binary decoder 305 is a "logical 1". The ENABLE 2 control signal applied to binary decoders 305 and 307 from the control logic unit 317 is initially at the "logical 1" level thereby assuring that the outputs from such decoders are then also at the "logical 1" level.

At the beginning of a given polyphase code sequence, the first signal received by the control logic unit 317 from the digital computer 115 is the TIMING GENERATOR ENABLE signal. Such signal then causes the ENABLE 2 control signal to change to the "logical 0" level. The transition of the ENABLE 2 signal from a "logical 1" to a "logical 0" is effective to cause the $Y_0$ output signal of binary decoder 305 to change from a "logical 1" to a "logical 0". The $Y_0$ output signal from binary decoder 307 is not affected, i.e. remains at the "logical 1" level, because both the ENABLE 1 and ENABLE 2 signals applied to such decoder are at the "logical 0" level. The $Y_0$ output signal from the binary decoder 305 is passed directly to the control logic unit 317 and, as indicated, passed (via an inverter 321) as a STOP command to other sections (not shown) within the timing generator 121 (FIG. 4). The STOP command is effective, for example, to inhibit functions such as range gate generation within the timing generator 121 (FIG. 4) as data is being transferred from the digital computer 115 (FIG. 4).

The second signal to the control logic unit 317 from the digital computer 115 is the LOWER BYTE LOAD pulse which here follows, by approximately 180 nanoseconds, the TIMING GENERATOR ENABLE signal. The UPPER BYTE ENABLE signal follows, by approximately 200 nanoseconds, the LOWER BYTE ENABLE signal to allow the UPPER BYTE STROBE pulses to be passed to binary counters 301 and 303. Binary counter 301 begins counting the UPPER BYTE STROBE pulses with the result that on each subsequent pulse the $Y_1$ through $Y_7$ outputs of binary decoder 305 are caused to be driven into the "logical 0" state. Output pulses $Y_1$ through $Y_6$ are passed as enable pulses to other sections (not shown) of the timing generator 121 (FIG. 4) for reasons not here relevant. It is noted, however, that the $Y_6$ output from binary decoder 305 is also passed to the control logic unit 317 as a data word 7 enable pulse (DW7EN) and the $Y_7$ output is provided directly to the control unit 317.

Digressing now for a moment, it will be recalled that in the correlation process using the transmitted and received signals, the polyphase coded L.O. signal must be delayed for a time equal to the propagation of radio frequency energy to the target and return. The requisite delay may be implemented by merely presetting an address counter with a binary word equal to the number of pulse intervals of delay required. It is noted here that both the transmit and receive phase codes may be offset to any phase, as determined by a phase offset word provided by the digital computer 115 (FIG. 4). The transmit and receive offset words here correspond, respectively, to the 7th and 24th word in each block of forty words. The particular offset so provided is determined from the requisite phase delay as follows:

$$\phi_{offset}=(N-\phi_{delay}) \qquad \text{Eq.(5)}$$

Thus, for example, if $\phi_{15}$ were programmed as the first phase setting to be provided to the phase shifter 229 (FIG. 4B), the phase offset would be $\phi_{offset}=(32-15)=\phi_{17}$ and, therefore, the minimum phase word would be written into the $\phi_{17}$ location in the RAM 309. Thus, the first phase word due to the offset will appear in the least significant location in the RAM 309 which corresponds to the location which is first read out of the RAM 309. It is noted here in passing that the RAM 309 is a 64 by 9 bit device which is here configured into two 32 word blocks, one for the receiver phase codes and the other for the transmitter phase codes. Thus, the upper half contains the 32 transmit phase states and the lower half the 32 receive phase states.

Upon receipt of the $Y_6$ output signal from the binary decoder 305, which corresponds to the transmit offset phase word, the control logic unit 317 generates a LOAD ENABLE PULSE for binary counters 313, 315. The latter then are effective to address a particular one of either the 32 transmit or receive phase codes, depending upon the binary number at the inputs of binary counters 313,315. Either the upper or lower (transmit or receive) half of RAM 309 is selected by the UPPER/LOWER ADDRESS ENABLE signal provided by the control logic unit 317. Thus, if the UPPER/LOWER ADDRESS ENABLE signal is a "logical 0" the transmit phase codes are selected, and, conversely, if such signal is a "logical 1" the receive phase codes are selected.

Upon receipt of the $Y_7$ output signal from binary decoder 305, which corresponds to the 8th data word in each block of forty words, and, therefore, to the first two transmit phase codes, the control logic unit 317 is effective to: (a) provide an ENABLE signal, E, to binary counter 303, (b) provide a DISABLE signal, E, to binary counter 301, and (c) provide a CHIP ENABLE signal to RAM 309. The latter then will now either read or write the data incident thereon, depending upon the level of the READ/WRITE signal from the control logic unit 317, which, in turn, is controlled by the timing of the UPPER and LOWER BYTE strobe pulses. When the READ/WRITE signal is a "logical 0" the data incident on the RAM 309 is written into the addressed location. Conversely, when the READ/WRITE signal is a "logical 1", data in the specified location is read out in inverted fashion to the storage register 311. Binary counters 313, 315, which control the addressing of RAM 309, are synchronously clocked with the READ/WRITE signals provided to RAM 309. It is noted that although contiguous READ/WRITE signals are provided to the RAM 309, the data read out while a polyphase code is being written in is meaningless and is dumped at storage register 311.

Binary counter 303 is configured as an offset counter, meaning that it will count sixteen UPPER BYTE STROBE pulses before providing an output signal to control logic unit 317. Keeping in mind that each UPPER BYTE STROBE pulse is preceded by a LOWER BYTE STROBE pulse and that both such strobe pulses are utilized in writing the polyphase codes into the RAM 309, this action insures that the thirty-two transmitter polyphase codes are written into the first thirty-two locations in the RAM 309. Upon receiving the output signal from binary counter 303 the control logic unit 317 is effective to (a) provide an ENABLE signal to binary counter 301 and (b) provide a DISABLE signal to binary counter 303.

Referring now for a moment to FIGS. 4D and 5A through 5F, the output signals from both binary counters 301 and 303 are shown to be changed on the rising edges of the UPPER BYTE STROBE PULSES corresponding to clock pulses. Thus, for example, the $Q_0$ output of binary counter 301 (FIG. 5B) is shown to go high on the rising edge of the first clock pulse (FIG. 5A) and to remain in that condition until the rising edge of the second clock pulse causes the $Q_0$ output to go low and the $Q_1$ output (FIG. 5C) to go high. The $Q_2$ and $Q_3$ outputs (FIGS. 5D, 5E) are in like fashion until the $Q_3$ output goes high upon receipt of the eighth clock pulse. The C output signal from such binary counters, which is provided as the output signal from binary counter 303 to control logic unit 317, is provided by combining in an AND gate (not shown) the $Q_0$, $Q_1$, $Q_2$ and $Q_3$ outputs. Thus, it is seen that the C output signal (FIG. 5F) to the control logic unit 317 is high between the rising edges of the 15th and 16th clock pulses. It will be recalled that the binary counter 301 was originally disabled after counting the seventh clock pulse, meaning that the $Q_3$ output from that device remained low (at the "logical 0" level) thereby insuring that binary decoder 305 was enabled and binary decoder 307 was disabled. The binary counter 301 was disabled for a total of sixteen UPPER BYTE STROBE pulses and, therefore, the next strobe pulse to which that binary counter will respond corresponds to the twenty-fourth UPPER BYTE STROBE pulse from the control logic unit 317. The twenty-fourth UPPER BYTE STROBE pulse will then be effective to cause the $Q_3$ output of binary counter 301 to go high (to the "logical 1" level) thereby enabling binary decoder 307 and disabling binary decoder 305. The $Y_0$ output signal from binary decoder 307 then corresponds to the twenty-fourth data word in the block of forty words from the digital computer 115 (FIG. 4). Such twenty-fourth data word is the receive offset phase word. Such output signal is applied both to the control logic unit 317 and to other sections (not shown) of the timing generator 121 as a data word 24 enable (DW24EN) pulse. Upon receipt of the $Y_0$ output signal from binary decoder 307, the control logic unit 317 is effective to (a) enable binary counters 313, 315, which, as explained hereinabove, control the addressing of the RAM 309, and (b) cause the UPPER/LOWER ADDRESS ENABLE signal to go high, thereby insuring that the receive polyphase code is written into the lower half of the RAM 309. When the twenty-fifth UPPER BYTE STROBE pulse is applied to binary counter 301, the binary decoder 307 will provide a $Y_1$ output signal which corresponds to the twenty-fifth data word and, therefore, to the first two receive phase codes to the control logic unit 317. The latter then is effective to (a) enable binary counter 303, and (b) disable binary counter 301 and enable RAM 309. The binary counter 303 remains enabled for sixteen UPPER BYTE STROBE pulses, while the thirty-two receive phase codes, which correspond to the twenty-fifth to fortieth polyphase codes, are written into the RAM 309.

A short time after all the polyphase codes from the digital computer 115 (FIG. 4) have been written into the RAM 309, the former sends a TIME MARK signal over line 1A to the control logic unit 317. It is noted here in passing that such TIME MARK signals occur every two milliseconds. Upon receipt of the TIME MARK signal the control logic unit 317 is effective to (a) reset binary counters 301, 303, 313 and 315 to zero, and (b) enable the RAM 309 in the READ mode. During the READ mode the binary counters 313 and 315 as well as the storage register 311 are clocked at the PRI rate by means of the transmit and receive phase clock signals which, as mentioned hereinabove, are provided by the digital computer 115 (FIG. 4) on lines C and D, respectively. It is noted that the storage register 311 is clocked on the leading (rising) edge of such clock signals, while the binary counters 313, 315 which address the RAM 309 are clocked on the trailing (falling) edge of such pulses. This action insures that the data is read out of the RAM 309 in the proper sequence as the storage register 311 will always be clocked prior to the RAM 309. The UPPER/LOWER ADDRESS ENABLE signal chooses the block of polyphase codes (either transmit or receive) as explained hereinabove. This allows for a new polyphase code to be presented at the phase shifter driver 228 (FIG. 4C) at each PRI and for the switching between the receive and transmit polyphase codes during each PRI. The requisite transmit polyphase code is changed approximately 120 nanoseconds before the leading edge of the EXCITER GATE pulse, which the timing generator 121 (FIG. 4) sends to gate 267 (FIG. 2C), to insure that the polyphase code is stable when the exciter portion (not numbered) of the master oscillator is turned ON. Propagation delays through the phase shifter 229 (FIG. 4C), the exciter portion (not numbered) of the master oscillator 123 (FIG. 4) and the timing generator 121 (FIG. 4) are, therefore, of no moment. The receive polyphase code is changed at the trailing (falling) edge of the EXCITER GATE pulse and must also undergo the same delays as the transmit polyphase code to insure a stable code.

As mentioned hereinabove, by using the digital computer 115 (FIG. 4) to compute the polyphase codes any combination of parabolic and linear or serradyne codes may be programmed. A pure parabolic phase code is generated by setting "d" in Eq. (4) to zero, while a serradyne component is added to the code by setting "d" equal to some integer. Thus, for example, where N is even and "d" is set equal to 2 the phase of each sequential pulse in the N code sequence is advanced by an amount equal to the smallest phase bit. For a thirty-two pulse code, then, this would result in the phase of each sequential pulse being advanced by 5.625 degrees. If, now, a serradyne phase code is added to the receive polyphase codes, the phase of the received signal will vary through 360 degrees for each code repetition frequency (the code repetition frequency is equal to 1/NT, when N is the number of pulses in a code and T is the interpulse period). It will now be appreciated by those of skill in the art that the just-described action would have the effect of shifting the frequency of the received signal by an amount equal to the code repetition frequency.

This ability to frequency shift the received signal by the application of a serradyne phase code to the first local oscillator signal can provide an advantage in an ECM environment. Thus, if the frequency of a jammer were positioned such that the jamming signals would not be rejected by the filtering provided in the microwave receiver 107 (FIG. 4) such unrejected signals would be downconverted to an I.F. frequency and passed to the I.F. receiver 111 (FIG. 4) wherein they would be downconverted to a second I.F. frequency by being mixed in mixers (not shown) with a signal from a voltage controlled crystal oscillator (VCXO), (also not shown). The thus double-downconverted I.F. signals are applied, after range gating, to a bank of narrow band roughing filters (not shown). If, therefore, the frequency of the double-downconverted jamming signals is such that they do not fall within the narrow band roughing filters (not shown) then the VCXO (also not shown) could be positioned to center such signals in the roughing filters (not shown). This, however, requires that the VCXO (not shown) have a relatively broad tuning range and VCXOs having the requisite tuning range tend to have large FM noise products.

It will now be appreciated that applying a serradyne phase code to the first local oscillator signal in the receive mode only will provide an additional degree of control of the I.F. frequency to allow jamming signals to be rejected while allowing the requisite tuning range of the VCXO to be narrowed. The amount of frequency shift applied is determined by the selected code repetition frequency.

Having described apparatus adapted to allow the contemplated method to be followed in a guided missile using a solid state transmitter in an active radar seeker, it will now be apparent to one of skill in the art that the contemplated method may be followed to advantage in other applications. Thus, even if the duty factor and repetition rate of the power oscillator or amplifier in a pulse radar transmitter may be changed in an efficient manner, it would be advantageous on many occasions to provide for polyphase coding. For example, a ground-based pulse radar used in radar astronomy could very well be adapted to take advantage of the contemplated method of polyphase coding. It is felt, therefore, that this invention should not be restricted to its disclosed embodiment, but rather should be limited only by the spirit and scope of the appended claims.

What is claimed is:

1. In the operation of a pulse radar transmitting a constant PRF waveform, such waveform being divided into successive sets of "N" pulses of radio frequency energy, each one of such pulses being at a predetermined frequency, the method of increasing the ambiguous range due to the constant PRF waveform, such method comprising the steps of:

(a) shifting, relative to the phase of the radio frequency energy in the first one of the "N" pulses in each successive set, the phase of the radio frequency energy in each successive transmitted pulse, the amount, in degrees, of such shift in phase for any given pulse being proportional to the square of the number, "n", of pulse intervals in the constant PRF waveform between the first pulse and the given pulse in each set of "N" pulses;

(b) correlating a delayed replica of each transmitted one of each one of the "N" pulses with simultaneously received echo signals from a desired range and from ambiguous ranges finally to produce "N" correlation signals, each one of such signals having an autocorrelated portion indicative of echo signals from the desired range and a cross-correlated portion indicative of echo signals from ambiguous ranges; and (c) integrating the "N" correlation signals to produce an output signal corresponding only to the sum of the autocorrelated portions in the "N" correlation signals.

2. The method as in claim 1 wherein "N" is an even integer and the phase shift, in degrees of the radio frequency energy in the "nth" pulse in each successive set of "N" pulses, is equal to: $(c180/N)n^2$, where c is an odd integer.

3. The method as in claim 2 wherein "N" is equal to $2^b$ where "b" is an integer.

4. The method as in claim 3 wherein the phase shifting of the radio frequency energy in each successive transmitted pulse is accomplished by actuating selected ones of the bits in a digital phase shifter having (b+1) bits.

5. The method as in claim 1 wherein "N" is an odd integer and the phase shift of the radio frequency energy in the "nth" pulse in each successive set of "N" pulses is equal to: $(c 180/N)n^2$ where "c" is an even integer.

6. In the operation of a pulse radar transmitting a constant PRF waveform, such waveform being divided into successive sets of "N" pulses of radio frequency energy whereby echo signals may be received simultaneously from each one of "N" ambiguous ranges, the method of distinguishing echo signals from a selected one of the ambiguous ranges when such signals have a Doppler shift impressed thereon, such method comprising the steps of:

(a) shifting, relative to the phase of the radio frequency energy in the first one of the "N" pulses in each successive set, the phase of the radio frequency energy in each successive transmitted pulse, the amount, in degrees, of such shift in phase for any given pulse being proportional to the square of the number, "n", of pulse intervals in the constant PRF waveform between a the first pulse and the given pulse in each set of "N" pulses;

(b) shifting the frequency of each successive transmitted pulse by an amount equal to the Doppler shift impressed on the echo signals from the selected one of the ambiguous ranges;

(c) correlating a delayed replica of each transmitted one of each one of the "N" pulses with simultaneously received echo signals from the selected one of the ambiguous ranges and from other ambiguous ranges finally to produce "N" correlation signals, each one of such signals having an autocorrelated portion indicative of echo signals from the selected one of the ambiguous ranges and a cross-correlated portion indicative of echo signals from other ambiguous ranges; and (d) integrating the "N" correlation signals to produce an output signal corresponding only to the sum of the autocorrelated portions in the "N" correlation signals.

* * * * *